Aug. 9, 1960     J. B. MASSEY     2,948,566
SUN VISORS
Filed Feb. 9, 1959
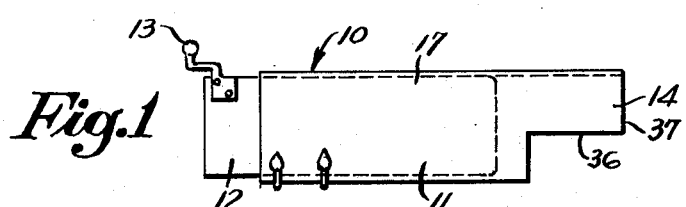
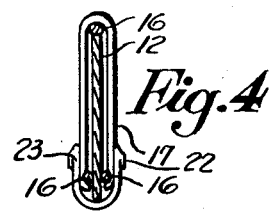
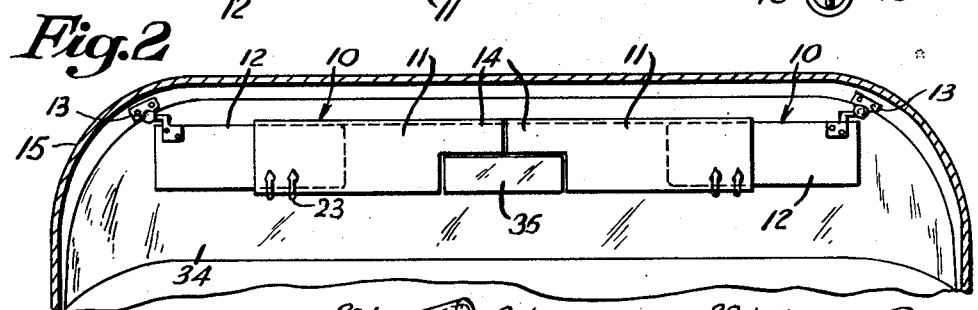
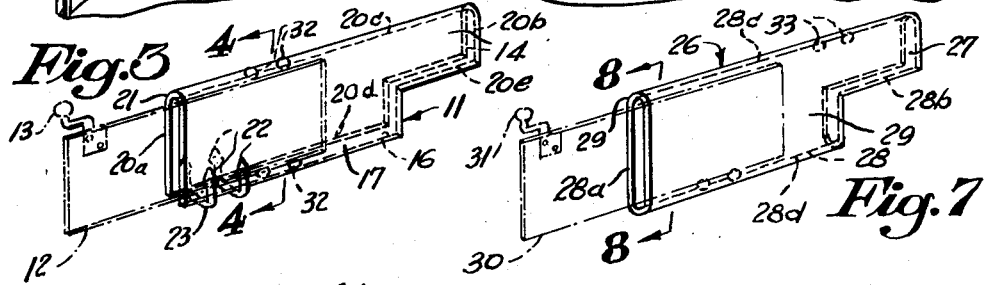
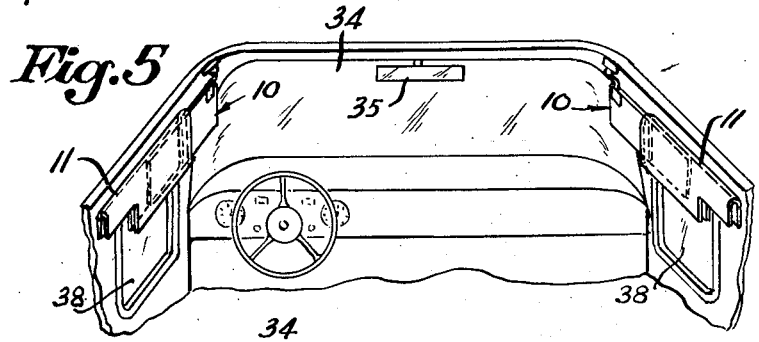
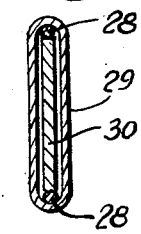
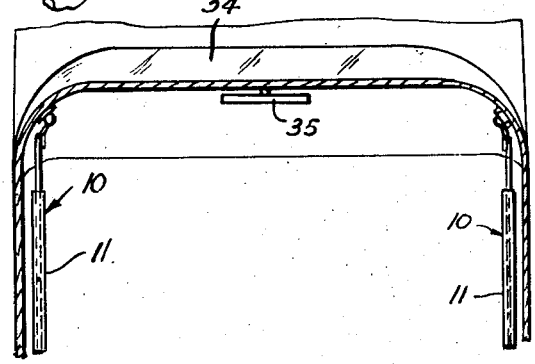
INVENTOR.
John Bruce Massey
BY Richards & Geier
ATTORNEYS

United States Patent Office 2,948,566
Patented Aug. 9, 1960

2,948,566

SUN VISORS

John Bruce Massey, 665 High St., Newark, N.J.

Filed Feb. 9, 1959, Ser. No. 791,887

5 Claims. (Cl. 296—97)

This invention relates to a sun visor, and refers more particularly to an extension sun visor.

There is no sun visor known in prior art which combines an extension sun visor portion with a standard sun visor, which may be effectively utilized not only to protect the operator from sun glare from the region of the rear view mirror, but which may be moved directly, without closing the extension, from such rear view mirror region glare protecting position, to a position protecting the operator from glare from the upper portion of the front side window of a conveyance.

The need for such a sun visor is a matter of general knowledge to those driving automobiles, trains or aeroplanes, directly into the glare of the sun.

One object of the sun visor of the present invention is the provision of an extension sun visor portion which can fit standard sun visors presently in use.

Another object is the provision of an extensible sun visor which is adapted to be included as standard equipment on automobiles, trains, or aeroplanes to be manufactured.

Another object is the provision of a sun visor which can be easily extended and closed.

Still another object is the provision of an extensible sun visor which will completely protect the operator from glare from the region of the rear view mirror without disturbing or touching the mirror in any way.

A further object is the provision of means protecting the operator from glare from the side window region.

A still further object is the provision of an extension sun visor which can be moved from a position completely protecting the operator from glare in the region of the rear view mirror, to a position protecting the operator from glare from the side window region without closing the extension visor portion and without disturbing or touching the mirror in any way.

Yet a further object is the provision of an extension sun visor which is inexpensive to manufacture and simple and effective in operation.

Other objects of the present invention will become apparent in the course of the following specification.

The objects of the present invention may be realized through the provision of a sun visor with an extension sun visor portion having a rectangular cut-out, corresponding to the shape of a rear view mirror, in one corner, and having an internal wire frame which is slidably disposed on the base sun visor portion in such a manner as to secure the extension portion to the base visor portion while allowing the extension to be freely moved.

The invention will appear more clearly from the following detailed description when taken in connection with the accompanying drawings, showing, by way of example, preferred embodiments of the inventive idea.

Figure 1 is a front view of the extension sun visor in the non-extended position.

Figure 2 shows two extension sun visors extended around an automobile rear view mirror.

Figure 3 is a perspective view of the extension sun visor, showing the extension portion in the extended position on the base visor.

Figure 4 is a vertical sectional view of the extension sun visor along the line 4—4 of Figure 3.

Figure 5 shows the extension sun visor covering the upper portions of the front side windows of an automobile.

Figure 6 is a top view of Figure 5.

Figure 7 is a perspective view of another embodiment of the extension portion of the extension sun visor, showing the extension portion in the extended position on the base visor.

Figure 8 is a vertical sectional view of the extension sun visor along the line 8—8 of Figure 7.

The sun visor 10, shown in the non-extended position in Figure 1, comprises an extension portion 11 fitted on, and supported by, a base portion 12. The base portion 12 has a swivel arm 13 by which it is rotatably connected to the vehicle 15 as shown in Figure 2. The extension portion 11 has a projection 14 on one end (Figure 1).

The base visor 12 may be any standard visor now in use on automobiles, or of any other suitable design.

The extension portion 11 best shown in Figures 3 and 4 is of the saddle type and comprises a wire frame 16 covered by a covering 17 of any suitable material, such as leatherette, fasteners 22 and straps 23.

The saddle type extension portion 11 is particularly suitable for use with base visors 12 which are not specifically designed to operate with extension sun visor portions, such as the base visors in cars already in use.

The wire frame 16 has two inverted U-shaped end portions 20a, 20b, one at each end, the portion 20b being shorter than the portion 20a. A top longitudinal portion 20c is connected to the end portion 20a at 21, and is also connected to the end portion 20b. Two bottom longitudinal portions 20d, are connected to the end portion 20a and are also connected to two angular wire portions 20e, which are connected to the end portion 20b. The size and shape of the portions 20e are made to conform to the size and shape of the rear view mirror 35.

The wire frame 16 may be made of any suitable rigid wire and shaped by any suitable means. The leatherette 17 is stretched over the frame 16 and attached thereto by any suitable means such as wire loops 32.

The operation and use of the saddle type extension portion is as follows:

After the frame 16 is shaped, the covering 17 attached thereto, and the buckles 22 attached to the covering, the extension 11 is fitted on top of the base visor 12 in the non-extended position (Figure 1) and the straps 23 are fastened at both ends to buckles 22. The wire frame 16 is in contact with the base visor 12 as shown in the vertical sectional view of Figure 4. The extension portion 11 may then easily be moved longitudinally relatively to the base visor 12, since the smooth wires 16 ride along the base visor 12 (Figure 4). In the extended position (Figure 3) the straps 23, being in contact with the bottom of the base visor 12, prevent the extension portion 11 from raising up off the base visor 12.

Because of the versatility added by the use of straps 23, the saddle type extension visor portion may be effectively used with a base visor 12 of almost any size or shape.

After being assembled and fastened to the vehicle, the extension sun visor 10, being in the non-extended position (Figure 1), is brought to a position covering the upper portion of the windshield 34 (Figure 2), and as such it is the same as an ordinary sun visor. The vehicle having two extension sun visors, both extension portions 11 may be extended horizontally toward the rear view mirror 35 until the entire upper portion of the windshield 34 is covered except for the mirror 35 (Figure 2). In this manner no glare at all may reach the operator's eyes from the upper portion of the windshield 34, yet allowing the rear view mirror 35 to be completely usable.

The projection 14 of the extension 11 (Figure 1) is such that the length of side 36 is equal to substantially one-half the length of the mirror 35, and the length of end portion 37 is sufficient to cover the windshield 34 above the mirror 35.

If the direction of the car is altered and the glare in the operator's eyes comes through the front side window 38, the operator may move the extension sun visor 10 directly to the front side window without disturbing the mirror 35 and then extend sun visor to its fullest length, (Figures 5 and 6). The extension sun visor 10 will thus cover the entire upper portion of the front side window 38 and the operator is fully protected from the possibility of glare in all directions.

A sleeve type extension portion 26 having a projection 27 is shown in the extended position in Figure 7 and comprises a wire frame 28 covered by leatherette 29 and attached thereto to wire loops 33. A base visor 30 and swivel 31 are shown by dashed lines. The frame 28 has an elongated oval shaped portion 28a at one end and a double wire portion 28b at the other end. The double wire portion 28b consists of an upper inverted U-shaped portion, a lower U-shaped portion and longitudinal portions connecting the inverted U-shaped portion with the U-shaped portion. A top longitudinal portion 28c and a bottom longitudinal portion 28d connect the oval portion 28a and the end projection 28b. The sleeve type extension portion 26 is particularly suitable for use with base visors 30 designed to be used as part of an extension sun visor, and the sleeve extension 26 would be fitted on the base visor 30 at the time the new car is manufactured.

The operation and use of the sleeve type extension portion embodiment 26 is as follows:

After the frame 28 is shaped and the leatherette 29 attached thereto, the extension 26 is fitted on the base visor 30. The extension 26 is designed to fit over a base visor 30 of a particular size and shape, and is slid on the base visor 30 like a sleeve or glove. The wire frame 28 is in contact with the base visor 30 as shown in Figure 8, and thus the extension 26 may be easily slid along the base visor 30.

Since the wire frames 20, 28 are resilient, a snug fit may be maintained between the extension portions 11, 26 and the base visors 12, 30, respectively, while still allowing for easily relative movement along the smooth wires 20, 28 (Figures 6, 7).

The sleeve type extension visor is used in the same manner as the saddle type previously described.

Among the advantages of the extension sun visor of the present invention are the following:

It can be made to fit any existing base visor presently in use; it can be placed in newly manufactured cars as standard equipment; the extension portion fits snugly on the base portion yet can be easily extended or closed; it completely protects the operator from glare in the region of the rear view mirror without touching or disturbing the mirror; it completely protects the operator from glare through the upper portion of the front side window; and it can be moved directly from the position preventing glare in the mirror region to the position preventing glare in the front side window region without touching or disturbing the mirror.

Thus it is apparent that the described examples are capable of many variations and modifications within the scope of the present invention. All such variations and modifications are to be included within the scope of the present invention.

What is claimed is:

1. An extension portion for a sun visor, comprising a resilient frame having two ends, said frame comprising a large inverted U-shaped portion disposed at one of said frame ends, a smaller inverted U-shaped portion disposed at the other one of said ends, said smaller inverted U-shaped portion having an uppermost point and said large inverted U-shaped portion having an uppermost point, said two uppermost points being on the same level, a straight upper longitudinal portion connecting the two uppermost points, two lower longitudinal portions, each connecting one end of said large inverted U-shaped portion with one end of said smaller inverted U-shaped portion, each of said lower longitudinal portions having a portion adjacent said large U-shaped portion parallel to said upper longitudinal portion, a portion adjacent said smaller U-shaped portion parallel to said upper longitudinal portion and a transverse portion interconnecting said parallel portions, the last-mentioned parallel portion being disposed closer than the first-mentioned parallel portion to said upper longitudinal portion; covering material disposed on said frame and extending from one of said lower longitudinal portions to said upper longitudinal portion and to the other of said lower longitudinal portions, and means connecting said covering material to said frame.

2. An extension sun visor portion in accordance with claim 1, comprising, detachable support means interconnecting said lower longitudinal portions.

3. In combination with a swingable base visor, an extension portion in accordance with claim 2, said extension portion being disposed on said base visor with said upper longitudinal frame portion on top of and in contact with said base visor, said base visor being disposed within the large inverted U-shaped portion of said extension portion, said lower longitudinal portions being in contact with said base visor, whereby said extension visor is longitudinally slidable on said base visor, said detachable support means firmly pressing against the bottom of said base visor, whereby said extension portion is prevented from falling off the base visor.

4. An extension portion for a sun visor, comprising a resilient frame having two ends, said frame comprising an elongated ovel-shaped portion at one of said frame ends, an end portion at the other of said frame ends and comprising an upper inverted U-shaped portion, a lower U-shaped portion and longitudinal portions connecting said inverted U-shaped portion with said U-shaped portion, said inverted U-shaped portion having an uppermost point and said U-shaped portion having a lowermost point and said oval-shaped portion having an uppermost point and a lowermost point, the two uppermost points being on the same level, a straight upper longitudinal portion normal to the plane of said oval-shaped portion and interconnecting said uppermost points, a lower longitudinal portion interconnecting said lowermost points, said lower longitudinal portion being parallel to said upper longitudinal portion and to said longitudinal portions; covering material disposed on said frame on either side of said longitudinal portions, and means connecting said covering material to said frame.

5. In combination with a swingable base visor, an extension portion in accordance with claim 4, said base visor being disposed within said oval portion of said extension portion, whereby said extension portion is prevented from falling off said base visor, wherein said extension portion is disposed on said base visor with said upper longitudinal frame portion on top of and in contact with said base visor and said lower longitudinal frame portion being below and in contact with said base visor, whereby said extension portion is longitudinally slidable on said base portion.

References Cited in the file of this patent

UNITED STATES PATENTS

| | | |
|---|---|---|
| 1,454,498 | Whall et al. | May 8, 1923 |
| 2,201,197 | Minor | May 21, 1940 |
| 2,311,402 | Lauer | Feb. 16, 1943 |
| 2,432,674 | Office | Dec. 16, 1947 |
| 2,629,626 | Ziler | Feb. 24, 1953 |
| 2,842,395 | Davis | July 8, 1958 |

FOREIGN PATENTS

| | | |
|---|---|---|
| 764,955 | Great Britain | Jan. 2, 1957 |